Figure 1:
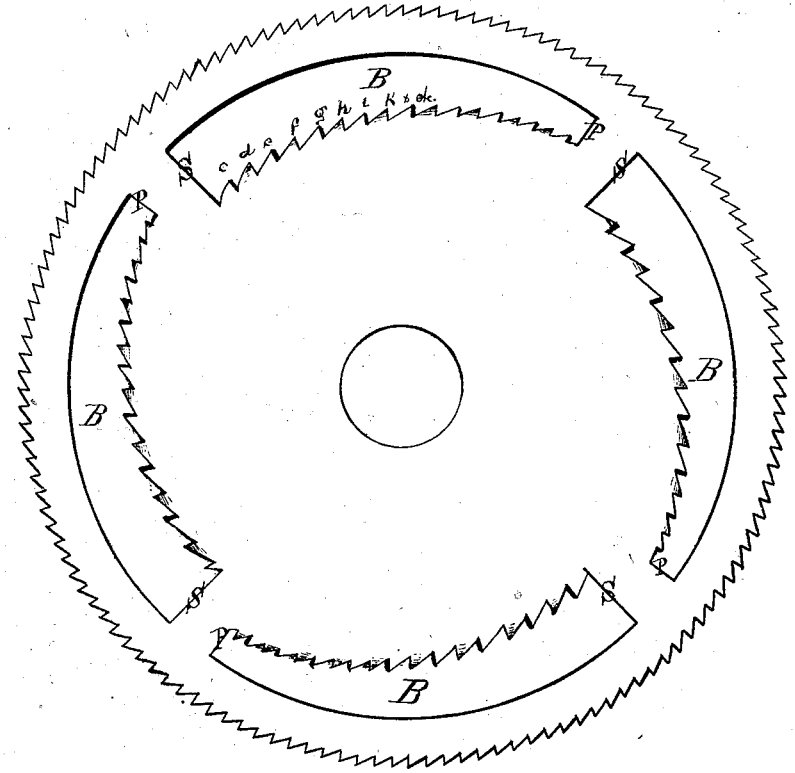

I. HOGELAND.
Circular-Saws.

No. 149,932.            Patented April 21, 1874.

Witnesses         Israel Hogeland.    Inventor
J. G. Whiteside
D. Turpie

UNITED STATES PATENT OFFICE.

ISRAEL HOGELAND, OF INDIANAPOLIS, INDIANA.

IMPROVEMENT IN CIRCULAR SAWS.

Specification forming part of Letters Patent No. 149,932, dated April 21, 1874; application filed December 12, 1873.

*To all whom it may concern:*

Be it known that I, ISRAEL HOGELAND, of Indianapolis, county of Marion and State of Indiana, have invented a Circular Saw, of which the following is a specification:

The object of my invention is to saw into the ends of slabs of wood of suitable size and thickness for the purpose, in such a manner as that, when such slab is bent in circular or barrel form, and the ends thus sawed drawn in together and bound by means of hoops, there shall be a regular taper from the center of such slab to the ends, so as to form a proper-shaped barrel, keg, tub, or other article of cooperage.

By the peculiar arrangement of the teeth of this saw the lower side of the slit or cut made by it will be wider than the upper side when the material is presented to the saw at a certain point between its center and periphery, and this gives the proper bevel to the wood on the sides of the slit or cut, so that when these parts are bound together by hoops they will have a full bearing the length of the slit; also, the saw being thin on the outside, the slit will close up tight the full length, thus making the seams of the barrel, keg, or other article of cooperage close and tight.

The advantages derived from the use of my invention are, that slabs or veneers turned from steamed or boiled logs can be cut while soft and wet, and by the use of proper hoops at once drawn into the required shape and left to dry. By working the slab or veneer soft a great saving is effected in the cost of timber, as material usually regarded as unfit for cooperage is readily sawed and bent into the required form, and when dry and hooped in the ordinary manner is equal in value to cooperage made from the best straight-grained timber.

The drawing shows the saw with the four openings or recesses, marked B, below the outer circle or edge of the saw. The teeth $c\ d\ e\ e$ in the recesses B decrease in size or length from C to K, and gradually increase in set from K to C. From S to S the distance is greater than from P to P, or, in other words, the smaller teeth in recess B are farther from the center of the saw than are the larger teeth. Hence the tooth C works lower in the under part of the cut than the tooth $d$, and so on uniformly to the smallest tooth; and the result is the proper bevel to enable the wood to come together squarely when bound with hoops in circular form.

Having thus described my invention, what I claim as new, and desire to secure by Letters Patent, is—

The circular saw with two separate sets of teeth, as shown in the drawing, so arranged that the outer teeth shall cut as in saws of ordinary construction, while the graduated teeth in the recesses B of the saw will cut the slit beveled from the upper to the under side of the material sawed, substantially as set forth.

Indianapolis, Ind., Nov. 11, 1873.

ISRAEL HOGELAND.

Witnesses:
   C. C. DARIUS,
   C. J. DROEGE.